F. CONRAD.
MOUNTING FOR OIL PUMPS.
APPLICATION FILED MAY 20, 1916.

1,344,756.

Patented June 29, 1920.
2 SHEETS—SHEET 2.

WITNESSES:
Fred. A. Lind.
J. R. Langley

INVENTOR
Frank Conrad
BY
Wesley G. Carr
ATTORNEY

UNITED STATES PATENT OFFICE.

FRANK CONRAD, OF SWISSVALE, PENNSYLVANIA, ASSIGNOR TO WESTINGHOUSE ELECTRIC AND MANUFACTURING COMPANY, A CORPORATION OF PENNSYLVANIA.

MOUNTING FOR OIL-PUMPS.

1,344,756.  Specification of Letters Patent.  Patented June 29, 1920.

Application filed May 20, 1916. Serial No. 98,809.

*To all whom it may concern:*

Be it known that I, FRANK CONRAD, a citizen of the United States, and a resident of Swissvale, in the county of Allegheny and State of Pennsylvania, have invented a new and useful Improvement in Mountings for Oil-Pumps, of which the following is a specification.

My invention relates to mountings for oil pumps and particularly to such pumps as are employed in connection with the lubricating systems of internal-combustion engines for driving motor vehicles.

My invention has for its object to provide a simple and efficient means for mounting oil pumps in such manner that the usual bearings, mountings and driving mechanisms therefor may be omitted.

In the arrangement of the various accessories of internal combustion engines for motor vehicles, it has been customary, heretofore, to mount the various devices upon the body of the engine and to provide separate bearings and, to some extent, separate driving shafts for each of such devices. This construction not only requires a large amount of space, but the manufacturing cost of the same is relatively high because of the provision of separate mountings, driving shafts and bearings for the several devices that are operatively connected to the internal combustion engine.

According to the present arrangement, the pump for circulating oil through the lubricating system of the engine and its connected parts is supported directly by the frame of a dynamo-electric machine, which may be, for example, a generator for furnishing current for lighting and ignition purposes and for charging a storage battery. The rotatable elements of the pump are operatively connected to the shaft of the dynamo-electric machine either directly, in case the oil pump is mounted in alinement with the shaft of the dynamo-electric machine, or the pump and the dynamo-electric machine may be connected by worm-gear mechanism. The latter arrangement may be conveniently employed in connection with a vertical ignition mechanism that is also driven by the shaft of the generator. The ignition mechanism and the pump may be driven by a common shaft.

Figure 1:
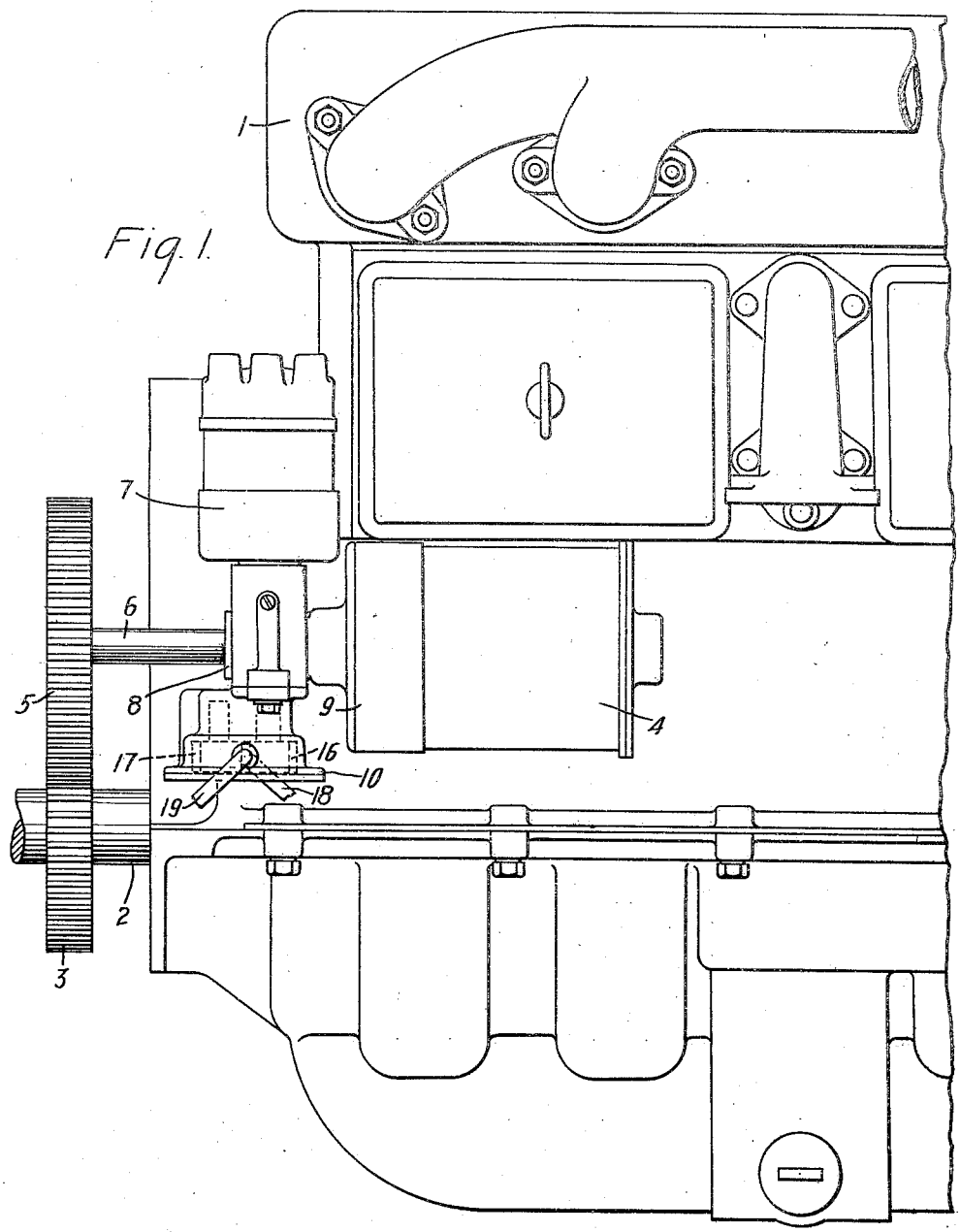
Figure 2:
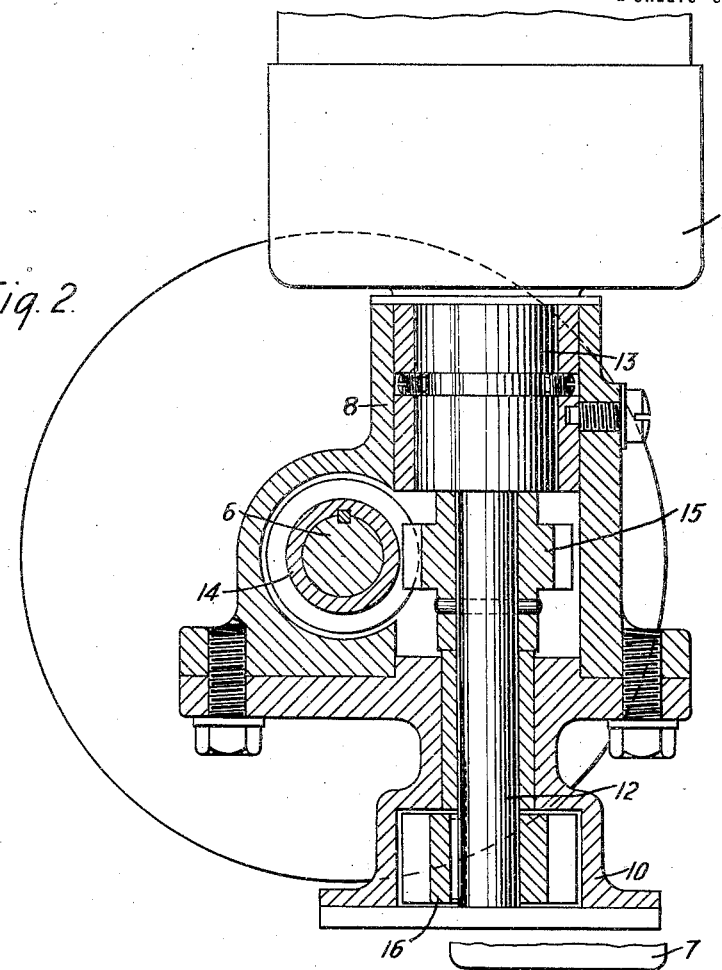
Figure 3:
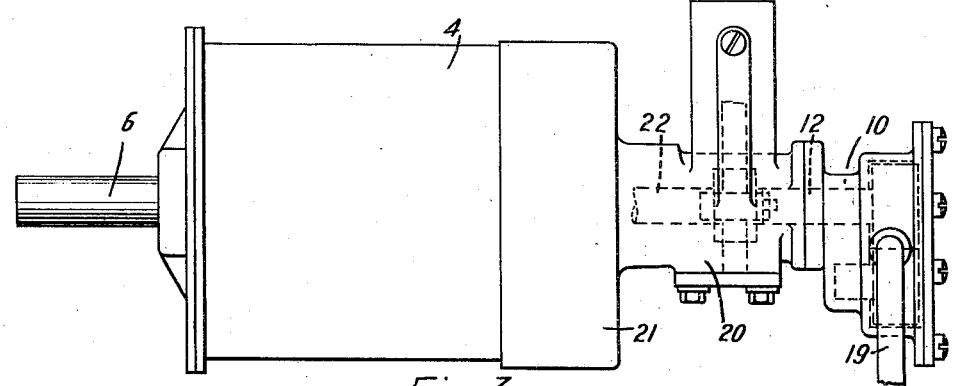

In the accompanying drawings, Figure 1 is a side view, in elevation, of a portion of an internal-combustion engine with my invention applied thereto. Fig. 2 is a view, partially in elevation and partially in section, of the mechanism of Fig. 1. Fig. 3 is a side view, in elevation, of a modification, the internal-combustion engine being omitted.

Referring particularly to Figs. 1 and 2, an internal-combustion engine 1 has a main shaft 2 that is provided with a gear wheel 3. A dynamo-electric machine 4, which is rigidly secured to the body of the engine, is operatively connected to the main shaft 2 by the gear wheel 3, a gear wheel 5, and a shaft 6 that is in alinement with the armature shaft of the dynamo-electric machine. An ignition device 7 of the vertical type is supported by a member 8 that is integral with an end bracket 9 of the dynamo-electric machine 4.

An oil pump 10 is also supported by the member 8 and is mounted with its driving shaft 12 in axial alinement with the shaft 13 of the ignition device that may comprise the usual ignition mechanism, such as an interrupter and distributer, for use in connection with gas engines, the details of which form no part of my present invention. The ignition device 7 and the oil pump 10 are operatively connected to the shaft 6 by means of a worm 14 and a worm wheel 15 that is mounted upon the shaft 12 and connected to the shaft 13 for rotation therewith.

The oil pump 10 is of the well-known type which embodies a pair of meshing gear wheels, the spaces between the teeth of which serve as buckets or pockets for carrying the oil from the inlet side to the outlet side of the pump. In Fig. 1 of the drawings, the gear wheels of the pump are shown in dotted lines at 16 and 17. A sectional view of the gear wheel 16 is shown in Fig. 2. The inlet and the outlet pipes of the pump are respectively indicated at 18 and 19.

Reference may now be had to Fig. 3, in which a modified form of my invention is illustrated. The ignition mechanism 7 is mounted in substantially the same manner as shown and described in connection with Figs. 1 and 2. The oil pump 10, however, is located with its driving shaft 12 in axial alinement with the armature shaft of the dynamo-electric machine 4. A member 20, which is integral with an end bracket 21 of the dynamo-electric machine, is suitably arranged for the rigid securing of the oil pump 10 thereto. The shaft 12 is operatively connected to the armature shaft 22 of the dynamo-electric machine in any suitable manner, as, for example, by means of the well-known Cardan joint.

It will be noted that, by means of the above described arrangements, I am enabled to omit separate bearings, mounting bracket and driving shaft that are usually provided for the oil pump. The frame of the dynamo-electric machine is modified in a simple manner to support the oil pump, and the arrangement for driving the pump from the shaft of the dynamo-electric machine is comparatively simple and inexpensive. The above described constructions enable the manufacturer of automobiles to economize not only in the space occupied by the various accessories but to very materially reduce the manufacturing cost of the assembled mechanism. The above and other advantages will be apparent to those skilled in the art relating to mechanisms of a similar character.

I claim as my invention:

1. The combination with an engine, and a dynamo-electric machine driven by said engine, of an oil pump directly mounted on said dynamo-electric machine and operatively connected thereto.

2. The combination with a dynamo-electric machine having a frame and a shaft, of an oil pump having a frame mounted on the frame of said dynamo-electric machine and a rotatable element operatively connected to said shaft.

3. The combination with a dynamo-electric machine having an armature shaft, of an ignition device and a pump mounted on said dynamo-electric machine, and means comprising a shaft geared to said armature shaft for operating the ignition device and said pump.

4. The combination with a machine having a frame and a propelling shaft, of an ignition device and a pump directly mounted on said frame, and means comprising a shaft operatively connected to said machine shaft for operating the pump and said ignition device.

5. The combination with a machine having a shaft and a frame comprising an end bracket, of an ignition device and a pump mounted on said end bracket, and means comprising a shaft operatively connected to said machine shaft for operating the pump and said ignition device.

6. The combination with a machine casing, a driving shaft associated with said casing and a gear wheel mounted on said driving shaft, of a combined pump and ignition unit mounted outside of said casing and provided with a shaft having a driven gear wheel mounted on it, said driven gear wheel being operatively connected to the gear wheel on said driving shaft.

In testimony whereof, I have hereunto subscribed my name this 28th day of April 1916.

FRANK CONRAD.